United States Patent [19]

de Briel et al.

[11] Patent Number: 5,301,782
[45] Date of Patent: Apr. 12, 1994

[54] DIAPHRAGM CLUTCH, IN PARTICULAR FOR MOTOR VEHICLES

[75] Inventors: Jacques T. de Briel, Levallois Perret; André Dalbiez, Argenteuil, both of, France

[73] Assignee: Valeo, Paris, France

[21] Appl. No.: 955,426

[22] Filed: Oct. 2, 1992

[30] Foreign Application Priority Data

Oct. 2, 1991 [FR] France .............. 91 12111

[51] Int. Cl.⁵ .............................................. F16D 13/71
[52] U.S. Cl. .............................. 192/89 BL; 192/70.27
[58] Field of Search ............... 192/70.27, 89 B, 89 PH

[56] References Cited

U.S. PATENT DOCUMENTS

| 2,138,169 | 11/1938 | Hunt | 192/70.27 |
|---|---|---|---|
| 3,939,951 | 2/1976 | Sink et al. | 192/89 B |
| 4,084,674 | 4/1978 | de Gennes | 192/89 B |
| 4,109,368 | 8/1978 | Hubbard et al. | 29/446 |
| 4,254,853 | 3/1981 | Huber | 192/70.27 |
| 4,326,611 | 4/1982 | Billet | 192/89 B |
| 4,353,451 | 10/1982 | Bacher | 192/89 B |
| 4,602,708 | 7/1986 | Nagano | 192/70.27 |
| 4,751,991 | 6/1988 | Naudin | 192/89 B |
| 4,892,177 | 1/1990 | Lanzarini et al. | 192/106.2 |
| 4,949,829 | 8/1990 | Tojima et al. | 192/89 B |
| 5,088,583 | 2/1992 | Takeuchi et al. | 192/70.27 |

FOREIGN PATENT DOCUMENTS

| 4013186 | 10/1990 | Fed. Rep. of Germany . | |
|---|---|---|---|
| 2473140 | 7/1981 | France . | |
| 2585424 | 1/1987 | France . | |
| 943039 | 11/1963 | United Kingdom | 192/89 B |
| 2186039 | 8/1987 | United Kingdom . | |

Primary Examiner—Richard M. Lorence
Attorney, Agent, or Firm—Longacre & White

[57] ABSTRACT

A diaphragm clutch mechanism including a cover plate, a diaphragm, an assembly for mounting the diaphragm pivotally on the cover plate, and at least one pressure plate. The assembly comprises a crown ring and a plurality of retaining lugs on the cover plate. Each retaining lug has at its free end a bent-over portion defining a locating bend. The crown ring is interposed between the diaphragm and a support crown, which bears against the locating bends of the retaining lugs.

11 Claims, 4 Drawing Sheets

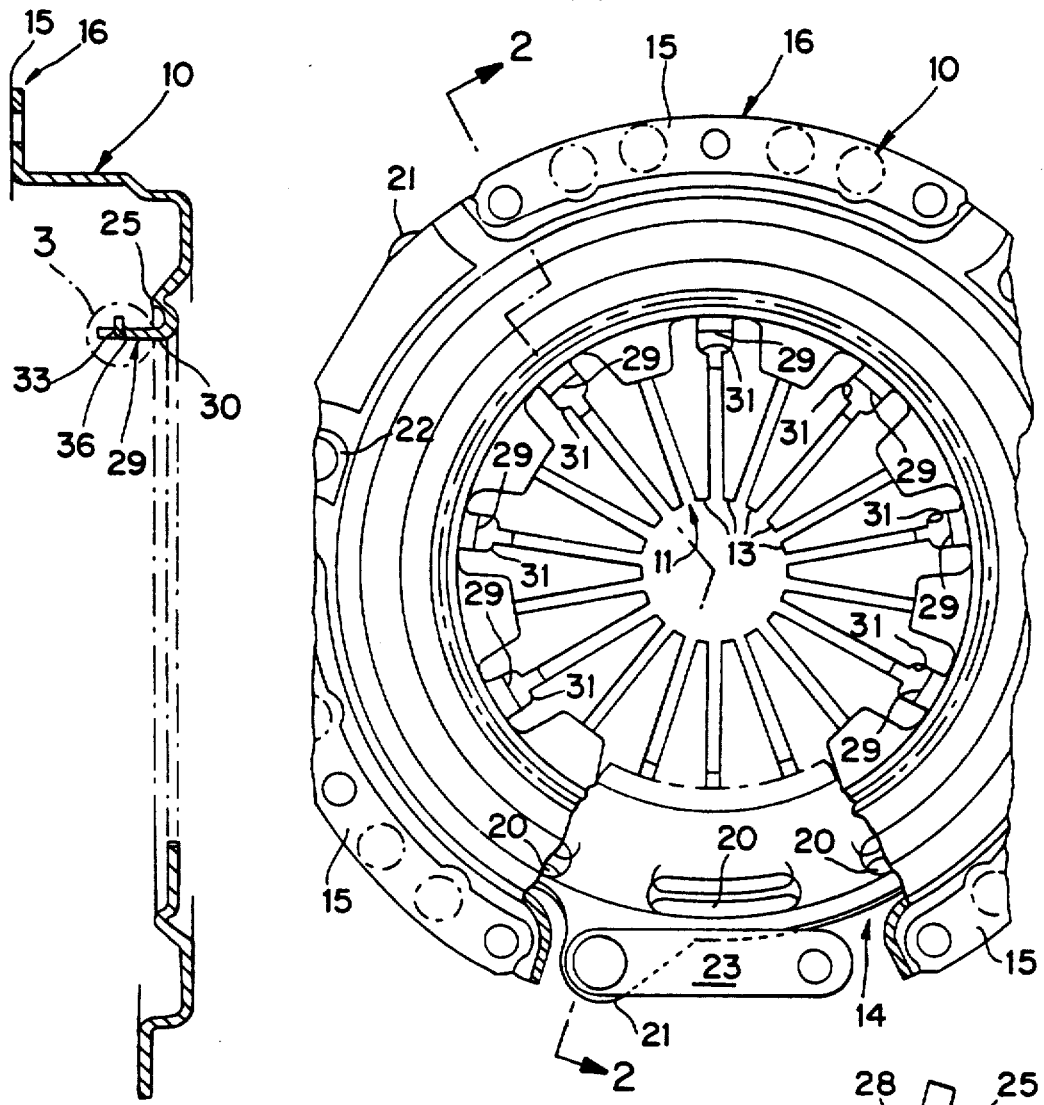
FIG. 1
FIG. 2
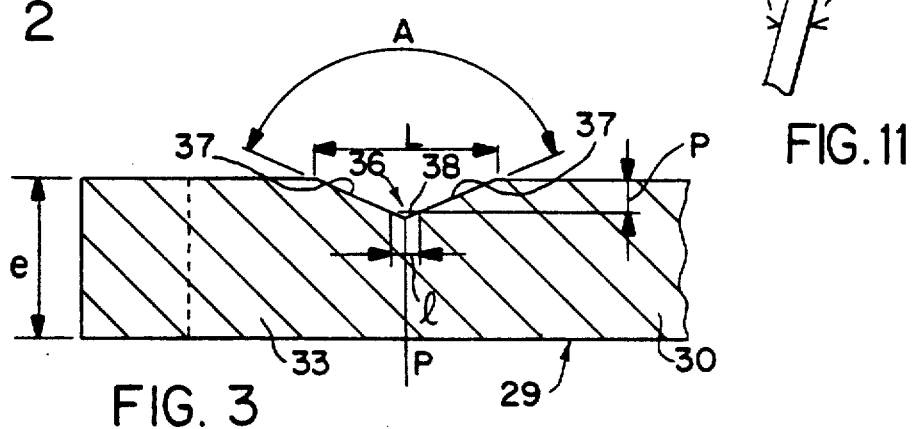
FIG. 3
FIG. 11

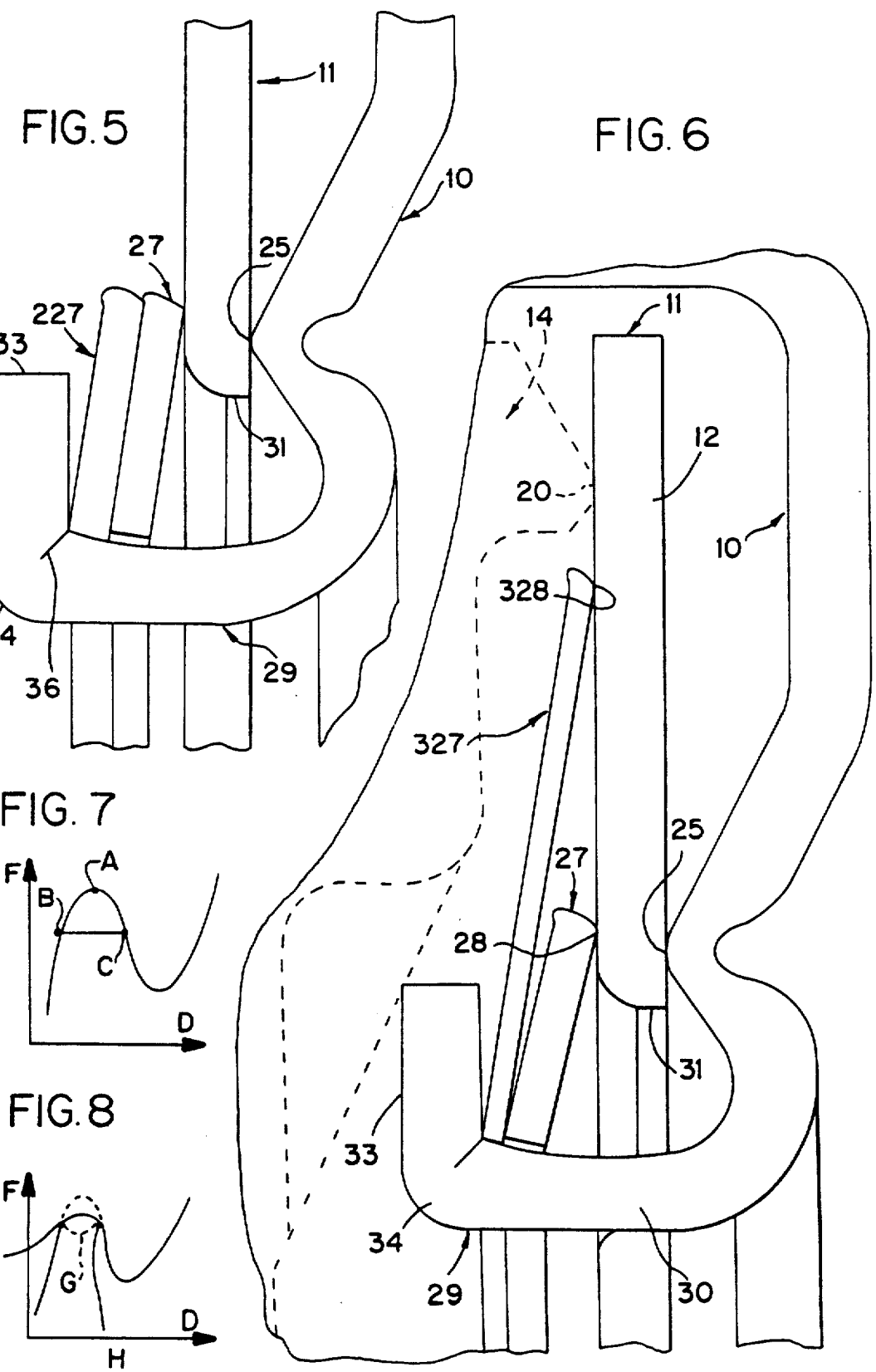

DIAPHRAGM CLUTCH, IN PARTICULAR FOR MOTOR VEHICLES

FIELD OF THE INVENTION

The present invention is concerned with diaphragm clutch mechanisms, i.e. actuating mechanisms for diaphragm clutches especially though not exclusively for motor vehicles, being of the kind comprising: a cover plate; a diaphragm having a peripheral portion defining a Belleville ring together with a central portion which is divided into radial fingers; assembly means pivotally mounting the said diaphragm to the said cover plate; and at least one pressure plate, which is fixed with respect to the cover plate for rotation with the latter while being movable axially with respect to the cover plate, with the diaphragm bearing through its outer periphery on the said at least one pressure plate.

Such a clutch mechanism is adapted to be carried by means of its cover plate on a reaction plate or flywheel of the clutch, which is mounted on a first shaft for rotation with the latter, a clutch friction wheel being inserted between the reaction plate and the pressure plate. The clutch friction wheel is fixed to a second shaft for rotation with the latter. Around this second shaft there is disposed the component conventionally known as a clutch release bearing, which is arranged to act on the ends of the radial fingers of the diaphragm for the purpose of disengaging the clutch. The clutch is of the kind that is normally in its engaged condition, in which the pressure plate clamps the clutch friction wheel against the reaction plate under the biassing action of the diaphragm.

BACKGROUND OF THE INVENTION

A clutch mechanism of the kind set out above is described in the specifications of French published patent application No. FR 2 585 424A and U.S. Pat. No. 4,751,991. In the latter, the said assembly means comprise, firstly an annular component called a crown ring, frusto-conical in shape and arranged on the side of the diaphragm opposite to the cover plate, and secondly a plurality of retaining lugs, which are relatively thin and which are flat. These retaining lugs are integral with the cover plate and pass axially through the diaphragm. Near to the free end of each of these retaining lugs, a locating bend is formed, with the crown ring bearing axially on the locating bends of the lugs. The diaphragm is thus mounted pivotally, with a resilient biassing action, between a primary abutment, carried by the cover plate, and a secondary abutment which is carried by the crown ring and which is aligned in facing relationship with the primary abutment.

For the assembly of such a clutch mechanism, the retaining lugs are initially straight, extending parallel to the axis of the assembly. The diaphragm and the crown ring are fitted over the free ends of these straight lugs, and these ends are then bent outwardly in order to form the locating bends mentioned above. For this reason, each of the retaining lugs is formed with a groove to define a line of bending, and this groove presents a local reduction in the thickness of the lug.

This arrangement is generally satisfactory, but the crown ring can sometimes become accidentally lodged or jammed in one or more of these grooves. As a result, after the bending of the lugs to form the locating bends, the crown ring then becomes held by the groove or grooves in which it is engaged, and as a consequence loses the desired freedom of movement which it needs in order that the diaphragm can pivot easily.

In addition, a substantial biassing force may occur, tending to restrain the diaphragm against its pivoting movement between the primary and secondary abutments. This restraint gives rise to parasitic frictional effects during the pivoting movement of the diaphragm, and some deformation of certain of the retaining lugs may be necessary in order to produce a variation in the spacing between the primary and secondary abutments when the diaphragm is pivoting.

The engagement surface which is offered by the crown ring to the diaphragm may also be reduced under these conditions. Thus there can arise a non-uniform pressure distribution at the level of the diaphragm when, for example, the crown ring becomes engaged in some of the grooves in the retaining lugs and not in others.

In order to overcome these drawbacks it has already been proposed to make technical changes and to modify the method of assembly, for example by modifying the cover plate, but always in ways that are expensive. This leads to a loss of the advantages which are obtained by the specific configuration of the cover plate.

DISCUSSION OF THE INVENTION

An object of the present invention is to overcome these drawbacks in a simple and inexpensive way, by providing an arrangement in which the crown ring is prevented from becoming caught up in the manner described above, while at the same time reducing the axial biassing force applied to the diaphragm, affording the latter an improved engagement surface, and at the same time continuing to benefit from the advantage of a cover plate of the kind having retaining lugs.

According to the invention, a diaphragm clutch mechanism comprising a cover plate, a diaphragm, which has a peripheral portion defining a Belleville ring together with a central portion divided into radial fingers, assembly means pivotally applying the diaphragm to the said cover plate, and at least one pressure plate, which is fixed to the cover plate for rotation with the latter while being movable axially with respect to the cover plate, with the peripheral portion of the diaphragm bearing on the said at least one pressure plate, wherein the said assembly means comprise, firstly, a crown ring on the side of the diaphragm opposite to the cover plate, and secondly a plurality of relatively thin, flat retaining lugs integral with the cover plate, the said retaining lugs passing axially through the diaphragm, with each said retaining lug defining a locating bend at its end, the said retaining lugs being relatively thin in the radial direction and relatively elongated in the circumferential direction, and wherein the diaphragm is mounted for pivoting movement between a primary abutment carried by the cover plate and a secondary abutment carried by the said crown ring, is characterised in that the crown ring is interposed axially between the diaphragm and a support crown, which is engaged on the retaining lugs and located on the locating bend.

The support crown which is provided in accordance with the invention enables the bending forces on the retaining lugs to be absorbed, and minimises any deformation of the crown ring, giving improved distribution of the pressures involved. In this way, better control is obtained in the force which is applied to the diaphragm, while the interface offered by the crown ring to the diaphragm is better distributed.

The stiffness of the crown ring is able to be reduced, as are wear effects, in particular those occurring in the diaphragm and its abutments. In addition, the angle of inclination of the crown ring with respect to the bent over ends of the retaining lugs is also reduced. In consequence, it is possible to design the crown ring in such a way that the variation in thickness of the diaphragm, during its pivoting action, gives rise to only a small variation in the diaphragm force. It is in fact sufficient that the position in which the clutch is engaged corresponds generally to a maximum point on the characteristic curve of the crown ring, this curve being generally sinusoidal.

It will also be appreciated that, due to the presence of the support crown, there is no need to support the retaining lugs while they are being bent over. In this connection, a technique similar to that disclosed in the specification of U.S. Pat. No. 4,109,368 could have been considered. However, because this involves rolling the retaining lugs around the ring (as shown in FIG. 2 of that patent), it is necessary to hold the retaining lugs radially internally during this operation, by means of a tool. This is not the case with the arrangements provided by the present invention, because the support crown acts as an anvil, which enables the forces involved in the bending of the retaining lugs to be absorbed.

If desired, the support crown may be specifically shaped at its inner periphery, in such a way as to enable the retaining lugs to be bent out without any need to form grooves or the like on the lugs. For example, during assembly, it is possible to hold the support crown in a fixed position and to bend the retaining lugs round it, the support crown having for this purpose a radiussed internal aperture.

In all cases, the bent retaining lugs are deformed in the vicinity of the support crown in such a way that no interference is possible between the retaining lugs and the crown ring, so that the latter can easily pivot while the diaphragm is being operated.

The support crown may also serve as a resilient compensating means for the purpose of flattening the characteristic curve of the diaphragm, which, again, has a generally sinusoidal shape, thus reducing the force required to be exerted by the driver of the vehicle when declutching.

By comparison with the arrangements disclosed in the specification of published German patent application DE 4 013 186A, it will be appreciated that the number of components in FIG. 12 of that specification is reduced, and that the components are simplified (compare FIGS. 4 to 7 of the same German specification). Thus for example, in FIG. 6 of that document, the component 23 is not adapted to serve as a support for a primary abutment.

In the mechanism of the present invention, the support crown may be so shaped as to act as a centring means for the crown ring, and/or to mesh with the retaining lugs. According to a preferred feature of the present invention, the support crown may be of frusto-conical shape. Thus, during the operation of bending the retaining lugs around the support ring (support crown), the axial portion of the retaining lugs is deformed and becomes slightly hollow, in such a way that the radial clearance that exists before the bending operation between the retaining lugs and the crown ring is increased after the lugs have been bent over. As a result there is no interference between the retaining lugs and the crown ring.

The same applies, though to a lesser extent, when the support crown is flat. In this case, it is possible if desired to increase the fitting clearance of the crown ring, with the latter being mounted on the retaining lugs with a fitting clearance that is greater than that of the support crown; though the same consideration can also apply when the support crown is frusto-conical in shape.

In all these cases, the cover plate and the diaphragm are preserved generally in their existing shapes without any modification being necessary to adapt them for the invention, though it should be noted that the length of the retaining lugs can be increased if necessary.

The support crown may have still another supplementary function, namely limitation of movement of the crown ring.

In a mechanism according to the invention, the diaphragm may be applied against the primary abutment of the cover plate with a resilient gripping force that may or may not be constant.

The details of diaphragm clutch mechanisms in accordance with the present invention, together with their features and advantages, will appear more clearly from the description of preferred embodiments of the invention which follows, and which is given by way of example only and with reference to the accompanying diagrammatic drawings.

BRIEF DESCRIPTION OF THE DRAWINGS

FIG. 1 is a view in elevation, shown partly cut away, of part of a diaphragm clutch mechanism in one form in accordance with the present invention.

FIG. 2 is a view in axial cross section taken on the line 2—2 in FIG. 1, of the single cover plate which is employed in the diaphragm clutch mechanism shown in FIG. 1, the cover plate being shown in FIG. 2 before being fitted to other components of the mechanism.

FIG. 3 shows on a larger scale the detail of FIG. 2 which is enclosed in the latter within a phantom circle indicated at 3, FIG. 3, showing in axial cross section a retaining lug before its end is bent over.

FIG. 5 is a view in axial cross section showing the assembly means in a second embodiment of the invention.

FIG. 6 is a view similar to FIG. 5 showing a third embodiment of the invention.

FIG. 7 shows the characteristic curve of the crown ring.

FIG. 8 shows the characteristic curve of the diaphragm for the embodiment shown in FIG. 6.

FIG. 11 is a diagrammatic view showing the inclination of the diaphragm during the declutching operation.

DESCRIPTION OF PREFERRED EMBODIMENTS OF THE INVENTION

Figure 4:
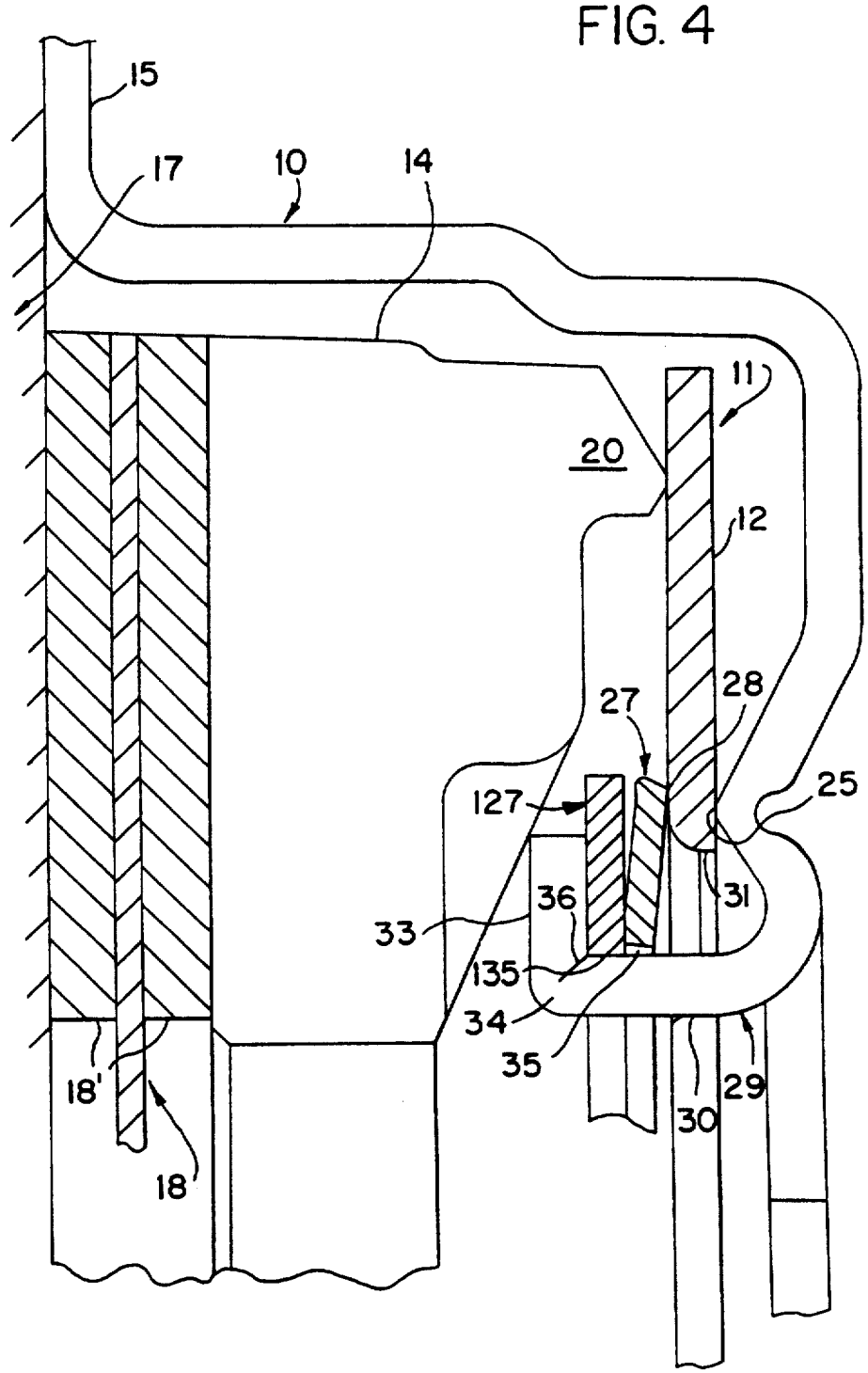
FIG. 4 is a half view in axial cross section, showing a clutch mechanism equipped with a support ring in accordance with the present invention.

In all of the embodiments shown in the drawings, the diaphragm clutch mechanism to which the present invention is applied includes a first, generally annular, component 10 referred to as a cover plate; a second, again generally annular, component 11 referred to as the diaphragm; at least one third annular component 14 referred to as the pressure plate; and assembly means mounting the diaphragm 11 pivotally to the cover plate 10.

The diaphragm 11 includes a peripheral portion 12 defining a Belleville ring, together with a central portion which is divided into radial fingers 13. The pressure plate 14 is fixed with respect to the cover plate 10 for rotation with the latter, but is movable in the axial direction with respect to the cover plate. The diaphragm 11 is supported on the pressure plate 14 through its Belleville ring portion 12. The cover plate 10 is hollow and in this example it completely surrounds the pressure plate 14. The cover plate is made of pressed sheet metal.

In a modification, the cover plate may surround the pressure plate 14 only partially, being then made deeper, while the reaction plate 17 (which is described below) is then hollow.

The cover plate 10 is adapted, by virtue of portions 15 of a peripheral radial flange 16, to be secured on the reaction plate 17. The latter, which also serves as a flywheel, is shown diagrammatically in FIG. 4. It is fixed to a first shaft for rotation with the latter. In this example this first shaft is the crankshaft of the motor vehicle. A clutch friction wheel 18 is inserted between the reaction plate 17 and the pressure plate 14. The clutch friction wheel 18 is also shown diagrammatically in FIG. 4, and is fixed to a second shaft for rotation with this second shaft, which in this example is the input shaft of the gearbox of the vehicle.

For cooperation with the diaphragm 11, the pressure plate 14 has a number of axial bosses 20 distributed around it. The outer periphery of the Belleville ring portion 12 of the diaphragm 11 bear against these bosses 20 as shown in FIG. 4. The pressure plate 14 also has a number of radially projecting lugs 21 arranged in spaced apart relationship on its periphery. A number of tongues 23 extend substantially tangentially to a circumference of the assembly, between the projecting lugs 21 and further portions 22 of the peripheral flange 16 of the cover plate 10. The tongues 23 secure the pressure plate 14 to the cover plate 10 so that these two components rotate together, while at the same time allowing axial displacement to take place between them. The tongues 23 are secured by riveting.

In a modification, a connection of the tenon and mortice type may be provided, like for example that which is described in the specification of U.S. Pat. No. 4,892,177 and the corresponding French published patent application No. FR 2 628 492A; and the clutch may have two or more pressure plates.

The cover plate 10 offers a first or primary abutment to the diaphragm 11, and more precisely to the inner periphery of the Belleville ring portion 12 of the latter. To this end the cover plate 10 is formed with an annular, half-wave, deformation defining a first abutment ring portion or primary abutment 25, which can be seen in FIGS. 2 and 4.

The assembly means, mentioned above, which mount the diaphragm 11 pivotally on the cover plate 10, include a generally annular fourth component 27, which is referred to here as the crown ring. The crown ring 27 is arranged on the side of the diaphragm 11 away from the cover plate 10, and offers a second abutment to the diaphragm 11, which is opposed to the abutment 25 as can be seen in FIG. 4. This second abutment is here referred to as the secondary abutment, and in this example it is defined by a rounded portion 28 at the outer periphery of the crown ring 27. This rounded portion 28 is arranged in line with the primary abutment ring portion 25 of the cover plate 10. The general shape of the crown ring 27 is frusto-conical. It can be seen that the two abutments 25 and 28 are continuous, which tends to reduce wear.

The assembly means whereby the diaphragm 11 is pivotally mounted on the cover plate 10 further include a number of retaining lugs 29, which are relatively thin and which are flat. In this example there are nine of these retaining lugs 29. They are fixed to the cover plate 10 and pass axially through the diaphragm 11 and the crown ring 27. More particularly, in this example the lugs 29 pass through apertures 31 formed in the diaphragm 11, close to the root of its radial fingers 13. Beyond the crown ring 27, each lug 29 has a terminal end portion 33, joined to an axially extending portion 30 of the lug by a locating bend 34. The bend 34, for mounting the crown ring 27, is formed by bending the end portion 33.

In this example, the retaining lugs 29 are integral with, and project from, the cover plate 10, being formed by appropriate pressing and bending operations of the blank from which the cover plate is formed. The line of bending of the lugs 29 extends substantially tangentially with respect to a circumference of the assembly. The retaining lugs 29 are, as has already been mentioned, relatively thin in the radial direction, but in the circumferential direction they are relatively long. In addition, the bent-over end portion 33 of each retaining lug 29 is substantially at right angles to its axial or straight portion 30, and extends in a generally radial direction away from the axis of the assembly.

Initially, before the diaphragm clutch mechanism is assembled, and in particular before the cover plate 10, diaphragm 11 and crown ring 27 are located together in axial relationship, the end portion 33 of each of the locating lugs 29 constitutes a straight extension of the main portion 30 of the lug, extending parallel to the axis of the assembly as shown in FIG. 3. Each retaining lug 29 is formed with a transverse groove 36, locally reducing its thickness in order to define a bending line. The cross sectional profile of the groove 36 is that of a trapezium, having a flat base portion 38 between two inclined lateral flank portions 37.

Preferably, the thickness of each retaining lug 29 being denoted by e in FIG. 3, the width L of the mouth of the groove 36 has a value lying between the value e and 1.8 times e, the depth p of the groove being in the range between 0.15e and 0.30e, with the width 1 of the base portion 38 being in the range between 0.05e and 0.50e. Preferably also, the angle A which is subtended by the lateral flank portions 37 of the groove 36 (which are symmetrical about the transverse plane P which bisects the base portion 38), lies in the range 90 degrees to 150 degrees.

The groove 36 may be made in any known manner, for example by cold forging or machining. In all cases, bending of the retaining lugs 29 having these grooves 36 can be carried out under excellent conditions and produces a correctly defined locating bend 34.

The crown ring 27, in the form of a Belleville ring, is in this example entirely disposed radially outwardly of the axial portion 30 of the retaining lugs 29, on which it is engaged as can be seen in FIG. 4. The crown ring 27 (or 427 in FIG. 9) is interposed axially between the diaphragm 11 and a support crown which is engaged on the retaining lugs 29 and abutted against the locating bend 34. This support crown is indicated at 127 in FIG. 4, 227 in FIG. 5, 327 in FIG. 6, 527 in FIG. 9 and 627 in FIG. 10.

With reference in particular to FIG. 4, the support crown 127 consists of a simple flat ring which is disposed entirely outside the retaining lugs 29 (in the radial direction). In FIG. 4, the inner periphery 135 of the support crown or ring 127 is adapted to engage on the main or axial portions 30 of the retaining lugs 29, preferably with a fitting clearance which is smaller than that of the crown ring 27 adjacent to it. The internal diameter 35 of the crown ring 27 is larger than the internal diameter 135 of the support crown 135.

Thus for assembly of the clutch mechanism, the diaphragm 11, crown ring 27 and support crown 127 must first be martialled together in axial relationship on the end portions 33 of the retaining lugs 29, parallel to the axis of the assembly. The end portions 39 are then bent outwardly so as to form the locating bends 34. During this bending operation, facilitated as explained above by the grooves 36 in the retaining lugs 29, the bending force is taken by the support crown 127. In practice a first stage of this bending operation is carried out with the aid of a conical tool, with another tool being used for a second stage of the operation so as to complete the bending of the end portions 33.

In a variant, it is possible to use a single tool which is engaged initially within the lugs 29. A first movement of the tool is carried out so as to bend the lugs 29 radially by radial movement of the tool, with a second movement then consisting in displacing the tool axially so as to bend the lugs 29 fully. The forces are still taken by the support crown 127.

During the bending operation, the support crown 27 is prevented from coming into contact with the end portions 33 of the retaining lugs 29, so that it cannot become embedded in the latter. Because of the fitting clearance, there is no interference between the straight portions 30 of the lugs 29 and the crown ring 27. It will be noted that this fitting clearance may be the same as that for the support crown 127, due to the fact that during the bending of the retaining lugs 29 the reaction force is supplied by the support crown 127 acting like an anvil. This increases the radial clearance, after bending, between the lugs 29 and the crown ring 27.

In addition, the force which is applied to the diaphragm 11 by the crown ring 27 is optimised, while the secondary abutment surface 28 by which the crown ring 27 engages on the diaphragm 11 is well spread, the support crown 127 then also constituting a thrust ring.

The diaphragm 11 is thus gripped between its abutments 25 and 28, with a well optimised force which enables wear in the abutments 25 and 28, and in the diaphragm 11, to be reduced. In this connection, it is a simple matter to select a suitable thickness and conicity for the crown ring 27 such as to give the required gripping effect, due to the fact that it is the support crown 127 that takes the bending forces.

Referring now to FIGS. 5 and 6, it will be realised that the support crown (indicated in these two Figures at 227 and 327 respectively) may of course be of frusto-conical form. In this case, after the retaining lugs 29 have been bent outwardly as described above, the radial clearance between the crown ring 27 and the axial portions 30 of the retaining lugs 29 is further increased, in such a way that the support crown 227 or 327 and the crown ring 27 can be fitted with the same fitting clearance on to the retaining lugs 29. After bending has taken place, the straight portion 30 of each lug 29 is slightly deformed, so as to become slightly hollow in the region of the bend 34. This is shown in FIGS. 5 and 6 somewhat exaggerated, for clarity.

In FIG. 5, the support crown 227 is made in the image of the crown ring 27, though in this example it is thicker than the latter. In FIG. 6, the support crown 327 is so shaped as to offer a tertiary abutment 328 to the diaphragm 11, this tertiary abutment 328 being disposed radially between the primary abutment 25 and secondary abutment 28, on the one hand, and the abutment 20 of the pressure plate 14 (through which the latter engages the diaphragm 11) on the other hand.

As will be understood from the foregoing description, it is possible to design the frusto-conical crown ring 27, and in particular to determine its thickness and conicity, in such a way that in the position in which the clutch is engaged with a new or re-lined clutch friction wheel (as indicated by the point C in FIG. 7, in which the abscissa D indicates the deflection or displacement, while its ordinate F indicates the force exerted), the force applied by the crown ring 27 to the diaphragm lies close to the point A in FIG. 7 on the characteristic curve of the crown ring 27. Thus, during pivoting of the diaphragm for disengagement of the clutch, this applied load hardly varies. The point A is a maximum in the characteristic curve of the crown ring 27, which is of generally sinusoidal shape, and which in this example is in fact the characteristic of a Belleville ring.

Referring to FIG. 11, when the diaphragm pivots during the declutching operation, the distance between the primary abutment 25 and secondary abutment 28 is increased, and by virtue of the design considerations discussed above, the applied load will remain substantially constant. The same consideration applies when the friction liners become worn, the diaphragm 11 then occupying the position shown in FIG. 9. Thus, due to the design, the force which is exerted on the diaphragm 11 by the crown ring 27 will fluctuate between the position B in FIG. 7 (representing a clutch which is worn) and the position C in which the clutch friction pads are new.

The embodiment of the invention shown in FIG. 6 enables the characteristic curve of the diaphragm 11 to be flattened as shown in FIG. 8. This characteristic curve is the same as that of the crown ring 27, with the abscissa of FIG. 8 indicating the deflection or displacement (D) while its ordinate indicates the force exerted (F). Flattening of the curve is obtained by virtue of the support crown 327 in the form of a Belleville ring. Thus, over the life of the clutch mechanism, the friction pads 18' of the clutch friction wheel 18 become worn in such a way that the pressure plate 14 comes closer to the reaction plate 17, with consequent inclination of the diaphragm 11. Normally this inclination has the effect of causing the force which is applied to the pressure plate to increase, the diaphragm being generally flat and vertical when in the position corresponding to new friction pads 18'. This position is indicated by the point H in FIG. 8 on the curve. The inclination of the diaphragm causes it to pass along the characteristic curve from the point H to the point E. The support crown 327 is designed to have a characteristic which corresponds to the curve indicated in broken lines at G in FIG. 8, which is inverse to that of the diaphragm, so that the support crown opposes the force exerted by the diaphragm on the pressure plate 14. It is in this way that the characteristic curve of the diaphragm is flattened as shown in FIG. 8, so that the force applied by the driver to the mechanism, in order to disengage the clutch, is reduced over the life of the clutch. The support crown 327 thus constitutes a resilient compensating means such as to flatten the characteristic curve of the diaphragm 11.

Figure 9:
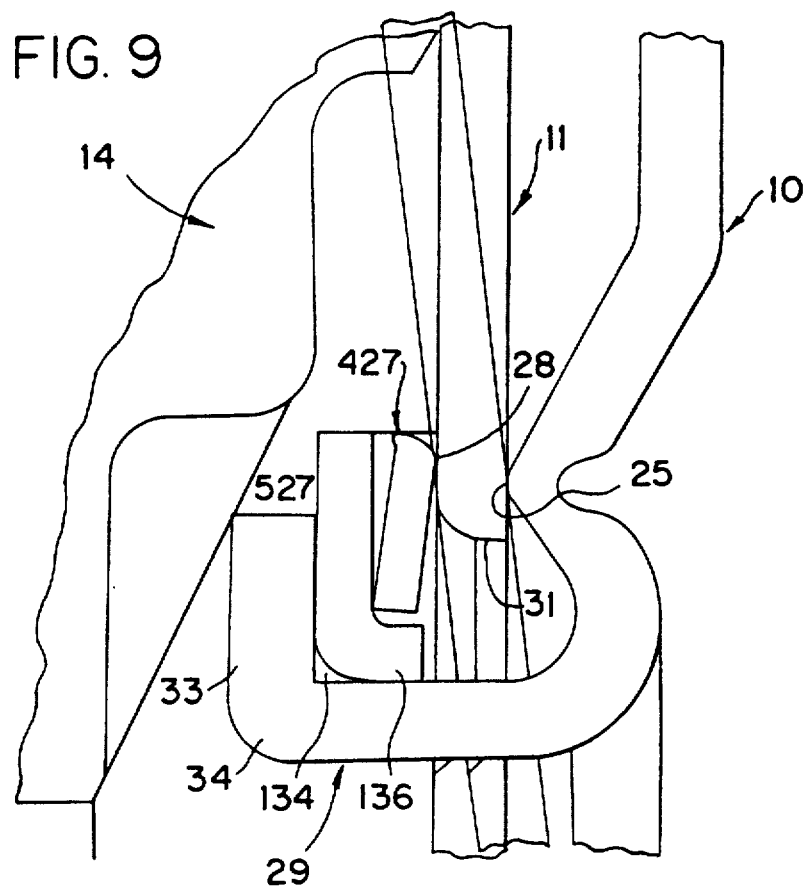
FIG. 9 is a view similar to FIG. 5, but shows a fourth embodiment of the invention.

The support crown may be so shaped as to centre the crown ring. Referring to FIG. 9 in this connection, the support crown 527 has a cross section which is generally L-shaped, defining a vertical or transverse portion which is adapted to come into contact with the bent over end portion 33 of the retaining lugs 29, and an axially oriented portion 136 which is directed towards the primary abutment 25 of the cover plate 10, and thus towards the diaphragm 11, the support crown 527 having a locating bend 134.

The axial portion 136 of the crown 527 thus defines an annular flange, oriented axially and engaged on the axial or main portion of the retaining lugs 29. The crown ring 427, which is frusto-conical in shape, lies radially entirely outside the axial flange 136, so that it can be centred by the latter. It will be appreciated that with this arrangement, the provision of the grooves 36 shown in FIG. 3 can be dispensed with. Thus during the bending operation of the retaining lugs 29, the support crown 427 can be held in a fixed position, with the retaining lugs 29 being bent about the support crown 527. The bending operation is here assisted by the locating bend 134 in the crown 527. However, the grooves 36 may be provided if desired, so as to facilitate bending still further.

Figure 10:
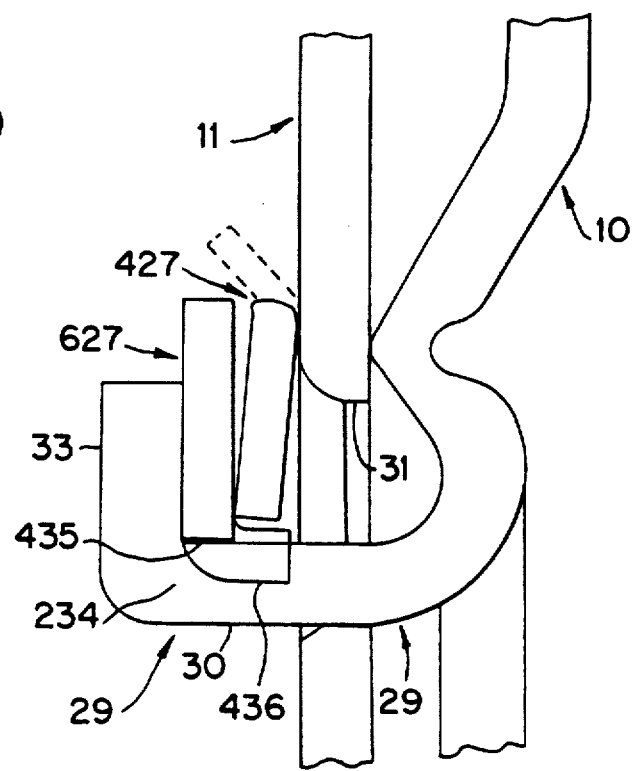
FIG. 10 is another view similar to FIG. 5, but shows a fifth embodiment of the invention.

The support crown 527 may extend radially further inwardly. Reference is made in this connection to FIG. 10, in which the axial flange, 436, of the support crown, 627, is notched so as to mesh circumferentially with the axial portions 30 of the retaining lugs 29. The inner periphery 435 of the radial or transverse portion of the support crown 627 is then in contact with the axial portions 30 of the retaining lugs 29, and extends into the locating bend 234. Thus, during the bending operation the retaining lugs 29 are well stabilised, due in particular to their meshing engagement with the flange 436.

The size of the inner periphery 435 does of course determine the depth of the radial flange 436 engaging with the axial portions 30 of the lugs 29. In this example, the inner diameter of the aperture 435 is so chosen that the crown ring 427 is able to be centred by the outer periphery of the flange 436, which thus extends radially outwardly of the main portions 30 of the lugs 29.

In a modification which is not shown in the drawings, the flange 436 may be in full circumferential engagement with the axial portions 30 of the lugs 29 (the lateral edges of the latter), without having the function of centring the crown ring 427.

In another modification, the support crown 127 of FIG. 4 may be formed with holes for engagement on the retaining lugs 29, and may then extend radially beyond the latter. Similarly, in FIGS. 9 and 10, the transverse portion of the support crown 527 or 627 may be extended, so as to project radially beyond the retaining lugs 29.

It will be appreciated that in every case, the support crown is in contact, through its transverse portion, with the bent-over end portions 33 of the retaining lugs 29, with its depth being preferably greater than that of the latter. It will also be appreciated that the depth of the crown is such that it can also serve as an abutment for the outer periphery of the crown ring 27 or 427. Thus, the crown ring is able to apply the diaphragm 11 constantly against its primary abutment 25, with the force exerted by this crown ring being then greater than the force exerted by the clutch release bearing (not shown in the drawings) on the inner extremity of the fingers 13 of the diaphragm 11. In cases in which this relationship does not obtain, the crown ring 427 is caused to be displaced during the declutching operation, its movement in this displacement being then limited by the support crown. In all cases the movement of the pressure plate is well controlled.

It will be realised that in the various forms of clutch mechanism described above, close control of the force applied to the diaphragm can be achieved regardless of its actual numerical value.

The present invention is of course not limited to the embodiments described above. In particular, the primary abutment may be defined on a ring which is carried by the cover plate. Similarly, the secondary abutment may be defined by a ring which is carried by the crown ring. In all cases, the invention enables the cover plate of the clutch to be preserved without modification. The axial dimension of the retaining lugs 29 of the cover plate may be increased, and this is not detrimental because the material then removed is in a portion which is normally excess.

The secondary abutment may be formed on the crown ring, being then defined by a shallow V-shape, to which the latter is shaped as indicated in broken lines in FIG. 10.

Finally, the crown ring may be made more rigid. It may have, at its inner periphery, a vertical or transverse portion for contact with the support crown, followed by a frusto-conical resilient portion carrying the secondary abutment in the form of a radius or a V.

What is claimed is:

1. A diaphragm clutch mechanism comprising: a cover plate; a diaphragm within the cover plate, the diaphragm having a peripheral portion defining a Belleville ring and a central portion radially inward of the peripheral portion, the central portion having a plurality of radial fingers; at least one pressure plate engaging the diaphragm; assembly means for mounting the diaphragm pivotally to said cover plate and to said at least one pressure plate; and means for mounting said at least one pressure plate to the cover plate for rotation with said cover plate and for axial movement of the pressure plate with respect to the cover plate, with the peripheral portion of the diaphragm bearing on said at least one pressure plate, said assembly means comprising a crown ring disposed at the side of the diaphragm opposite to the cover plate, the cover plate including a plurality of integral, relatively thin flat retaining lugs constituting a further part of said assembly means and passing axially through the diaphragm, with each retaining lug having a bent-over end portion defining a locating bend of the lug, each retaining lug being relatively thin in the radial direction and relatively elongated in the circumferential direction, the cover plate defining a primary abutment for the diaphragm, said crown ring defining a secondary abutment for the diaphragm whereby the diaphragm is mounted for pivoting movement between the primary abutment and the secondary abutment, wherein the mechanism further includes a support crown engaged on said retaining lugs and located on the locating bends of said retaining lugs, with the crown ring being interposed axially between the diaphragm and the support crown, wherein each of the crown ring and the support crown have a respective internal aperture, the internal aperture of the crown ring being larger than that of the support crown.

2. A clutch mechanism according to claim 1, wherein each retaining lug has an axially extending portion, the support crown extending radially entirely outside the said axially extending portions of the lugs.

3. A clutch mechanism according to claim 2, wherein the support crown is flat.

4. A clutch mechanism according to claim 2, wherein the support crown is frusto-conical in shape.

5. A clutch mechanism according to claim 4, wherein the support crown defines a tertiary abutment for the diaphragm, disposed radially between the said primary and secondary abutments on the one hand and the diaphragm engaging means of the said at least one pressure plate on the other hand, the said support crown being so shaped as to define a resilient compensating means whereby to oppose forces exerted by the diaphragm on the pressure plate or plates, so as to flatten the characteristic curve of the diaphragm.

6. A clutch mechanism according to claim 1, wherein the support crown is adapted to centre the crown ring.

7. A clutch mechanism according to claim 6, wherein the support crown is generally L-shaped, having a transverse portion and an axially oriented portion, the transverse portion being adapted to come into contact with the bent-over end portions of the said retaining lugs, and the axially oriented portion facing towards the said primary abutment of the cover plate, the support crown further defining a locating bend of the support crown, joining the said axial and transverse portions.

8. A clutch mechanism according to claim 7, wherein the crown ring extends radially entirely outside the said axial portion of the support crown.

9. A clutch mechanism according to claim 7, wherein each said retaining lug includes an axial portion extending from its locating bend, the axially oriented portion of the support crown being notched whereby to mesh with the axial portions of the retaining lugs.

10. A clutch mechanism according to claim 7, wherein the locating bend of the support crown is adapted for the retaining lugs to be bent around it.

11. A clutch mechanism according to claim 1, wherein the said support crown is of such a height as also to define an abutment for the outer periphery of the crown ring.

* * * * *